United States Patent [19]

Tokura et al.

[11] 4,027,291
[45] May 31, 1977

[54] ACCESS CONTROL UNIT

[75] Inventors: Koichi Tokura, Ichikawa; Saburo Kaneda, Yokohama, both of Japan

[73] Assignee: Fujitsu Ltd., Kawasaki, Japan

[22] Filed: Sept. 5, 1975

[21] Appl. No.: 610,642

[30] Foreign Application Priority Data

Sept. 12, 1974 Japan .......................... 49-105367

[52] U.S. Cl. .................................. 340/172.5
[51] Int. Cl.² ................................. G06F 13/00
[58] Field of Search ....................... 340/172.5

[56] References Cited

UNITED STATES PATENTS

| | | | |
|---|---|---|---|
| 3,629,842 | 12/1971 | Taylor | 340/172.5 |
| 3,766,527 | 10/1973 | Briley | 340/172.5 |
| 3,866,180 | 2/1975 | Willette | 340/172.5 |
| 3,990,051 | 11/1976 | Shelly | 340/172.5 |

*Primary Examiner*—Gareth D. Shaw
*Assistant Examiner*—C. T. Bartz
*Attorney, Agent, or Firm*—Daniel Jay Tick

[57] ABSTRACT

An access control unit for controlling a memory device having a plurality of memory units for storing data in a manner whereby the memory units are accessed sequentially, comprises a data register for storing data read out from the memory device, a cycle designation device for indicating in every cycle the memory unit of the memory device to be accessed in the relevant cycle, an address device for providing in each cycle an address to the memory unit indicated by the cycle designation device, a non-coincidence detection circuit for detecting non-coincidence between the memory unit indicated by the address and the memory unit practically provided with that address, and an invalidating device utilizing the output of the non-coincidence detection circuit for invalidating data read out from the memory device in a cycle a specified number of cycles after that in which non-coincidence is detected.

6 Claims, 8 Drawing Figures

ACCESS CONTROL UNIT

BACKGROUND OF THE INVENTION

The present invention relates to an access control unit. More particularly, the invention relates to an access control unit for a memory device, expecially the memory device of a data processing system having an interleaved memory unit wherein if the contents of the cycle designation counter which sequentially instructs the several memory units does not coincide with the memory unit indicated by the address information and to be accessed, such address information is temporarily held. This provides control, so that instruction by the contents of the cycle designation counter coincides with the memory unit to be accessed.

When the machine cycle speed of the data processor of a microprogram data processing system becomes high, for example, the cost of a control memory device having an access time fast enough to satisfy the aforementioned cycle speed increases. A method is thus desired which assures the same effect as that of the high speed cycle time with a memory having a slower speed access cycle time. An interleaved method is utilized as the aforedescribed method. In such method, the control memory device is divided into two control memory units, for example, divided into two banks. Access is undertaken alternately for each bank and the micro instructions are read out equivalently for every machine cycle. In this case, the following methods are undertaken in order to provide a smooth execution.

1. The microprogram is designed so that access is always undertaken alternately for both banks.
2. The address is always supervised, and when an access request is issued twice in succession to the same bank, the previous access to the bank is undertaken and then the next access is made at such time to the same bank.

The first method is considerably difficult to form a program, so that access to the bank is always undertaken alternately. Moreover, in the second method, the access time becomes slow, since the bank to be accessed is determined after confirming the address, and it is also difficult to provide a timing when access is made in succession to the same bank.

An object of the invention is to overcome the aforedescribed disadvantages. In order to accomplish this, the access starting cycle of both banks is fixed and the address is alternately supplied to both banks without any requirement. On the other hand, when the bank designated by the address does not coincide with the bank accessed practically, the erroneous data is invalidated.

In this method, the bank to be accessed is not determined after confirming the address, but access is always undertaken alternately at an arbitrarily specified period. Therefore, a higher speed is provided than that in the second method. However, when access is requested twice in succession of the same bank, the second access is requested of the bank in the opposite side. Therefore, the resultant erroneous data is invalidated and access is undertaken to the correct bank by trial with the same address. As a result, the time for one cycle is wasted. However, a higher speed than that in the second method is obtained when such access to the same bank in succession is not undertaken so often.

Furthermore, the microprogram may be designed more freely than in the first method. For this purpose, the access control unit of the present invention is used in data processing equipment providing several control memory units which store instructions, are accessed in common, and are interleaved. A cycle designation counter which instructs in succession the access for the control memory unit, and address holding register, and an access comparison detection means which detects non-coincidence between the contents of the counter and access for the particular aforedescribed control memory unit, are provided. The control provided is such that the processing of instructions read out is invalidated during the relevant cycle at a previously determined cycle time, while non-coincidence is detected by the access comparison detection means.

BRIEF SUMMARY OF THE INVENTION

In accordance with the invention, an access control unit for controlling a memory device having a plurality of memory units for storing data in a manner whereby the memory units are accessed sequentially, comprises a data register for storing data read out from the memory device. Cycle designation means indicate in every cycle the memory unit of the memory device to be accessed in the relevant cycle. Address means provide in each cycle an address to the memory unit indicated by the cycle designation means. Non-coincidence detection means detect non-coincidence between the memory unit indicated by the address and the memory unit practically provided with that address. Invalidating means utilize the output of the non-coincidence detection means for invalidating data read out from the memory device in a cycle a specified number of cycles after that in which non-coincidence is detected.

The data stored in each memory unit of the memory device includes instructions and the next address. Instruction decoding means decode the contents of the data register.

Address holding means hold an address during a specified cycle. Means supply the address to be held in the address holding means thereto in a cycle a specified number of cycles after that in which non-coincidence is detected by the non-coincidence detection means.

The invalidating means comprises clock control means for stopping a clock pulse to the data register.

Data stored in the data register comprises a first type data which includes both the upper and lower digits of the next address and a second type data which includes only the lower digits of the next address. The address holding means holds both the upper and lower digits of the next address for the first type data and only the lower digits of the next address for the second type data. The upper digits are the same as those of the first type data.

Address assembling means provides the next address. Means supplies to the address assembling means both the upper and lower digits of the next address from the data register when data stored in the data register is the first type data. The means supplies to the address assembling means the upper digits from the address holding means and the lower digits from the data register when data stored in the data register is the second type data. The means supplies both the upper and lower digits from the address holding means in the cycle a specified number of cycles after that in which non-coincidence is detected by the non-coincidence detection means.

BRIEF DESCRIPTION OF THE DRAWINGS

In order that the invention may be readily carried into effect, it will now be described with reference to the accompanying drawings, wherein.

In the figures, the same components are identified by the same reference numerals.

DETAILED DESCRIPTION OF THE INVENTION

Figure 1:
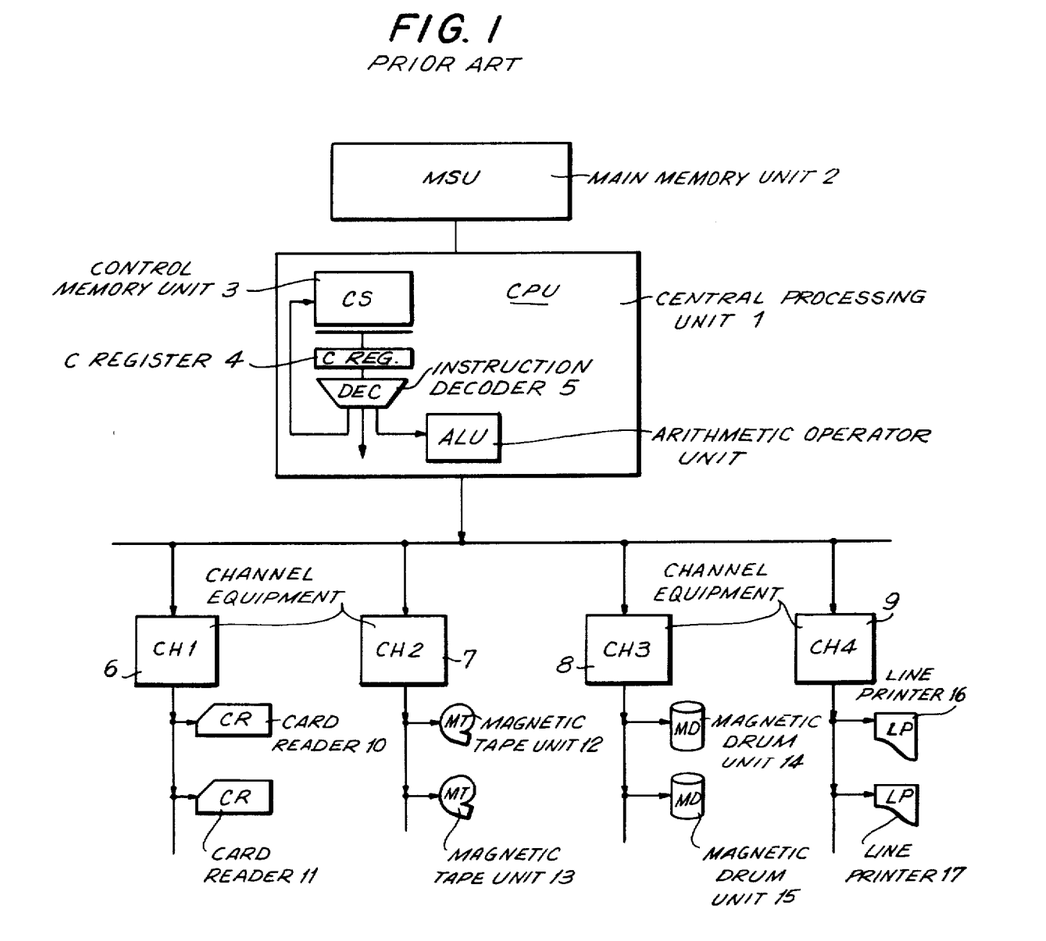
FIG. 1 is a block diagram of a known type of data processing system.

In the data processing system of FIG. 1, a central processing unit 1 is connected to a main memory unit 2. The central processing unit 1 includes a control memory unit 3 which stores micro instructions and is connected to a C register 4 for reading out the micro instructions. The central processing unit 1 further includes an instruction decoder 5 connected to the output of the C register 4. The instruction decoder 5 provides a decoding result which is supplied to an arithmetic operator unit ALU which executes instructions and reads out the next instruction.

The central processing unit 1 is connected to channel equipment 6, 7, 8 and 9. The channel equipment 6 is connected to peripheral equipment such as card readers 10 and 11. The channel equipment 7 is connected to peripheral equipment such as magnetic tape units 12 and 13. The channel equipment 8 is connected to peripheral equipment such as magnetic drum units 14 and 15. The channel equipment 9 is connected to peripheral equipment such as line printers 16 and 17.

The invention is hereinafter described principally in the form of the access control unit of the control memory 3 of the central processing unit 1. However, the present invention is not so limited, of course, and may be applied to every kind of the access control for an interleaved memory device.

Figure 2:
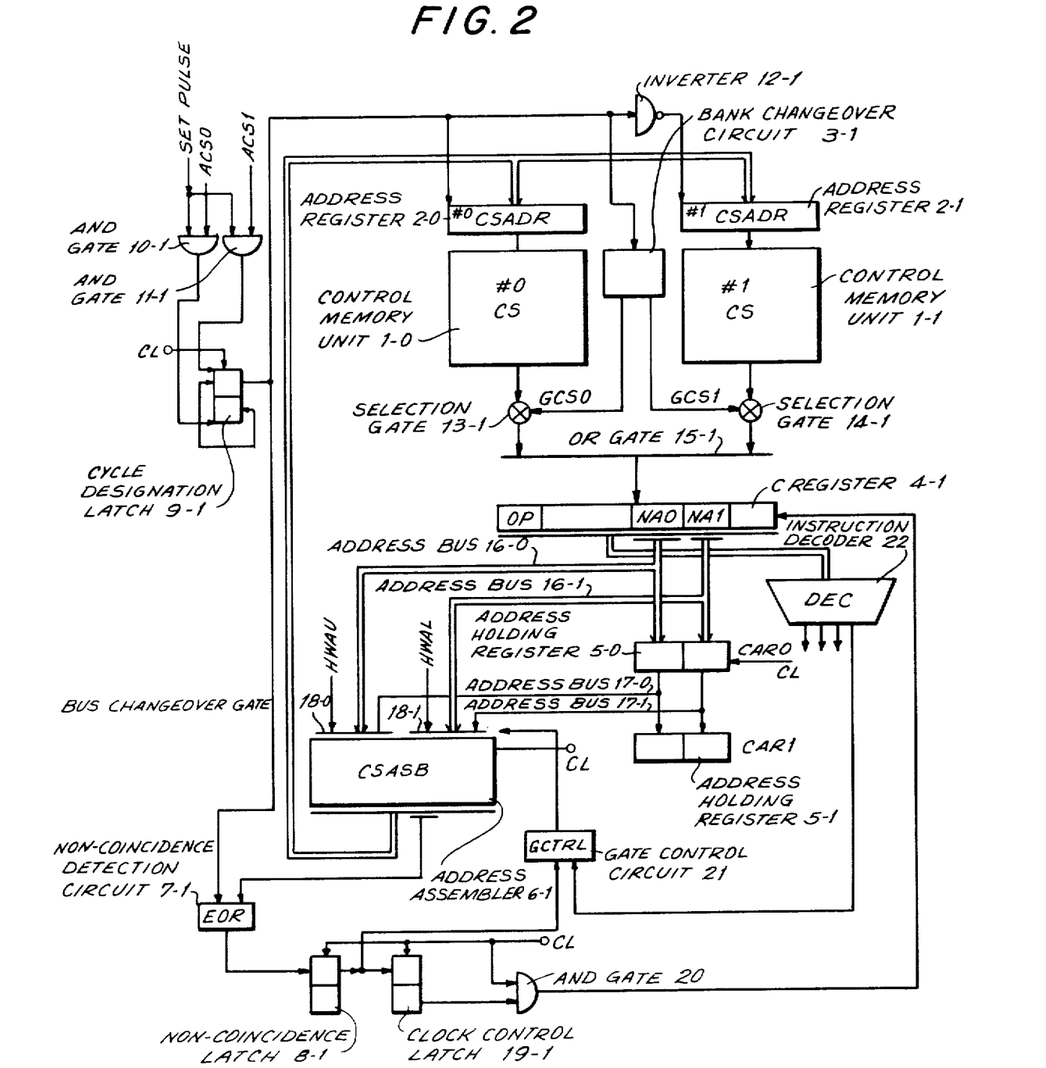
FIG. 2 is a block diagram of an embodiment of the access control unit of the invention.
Figure 3:
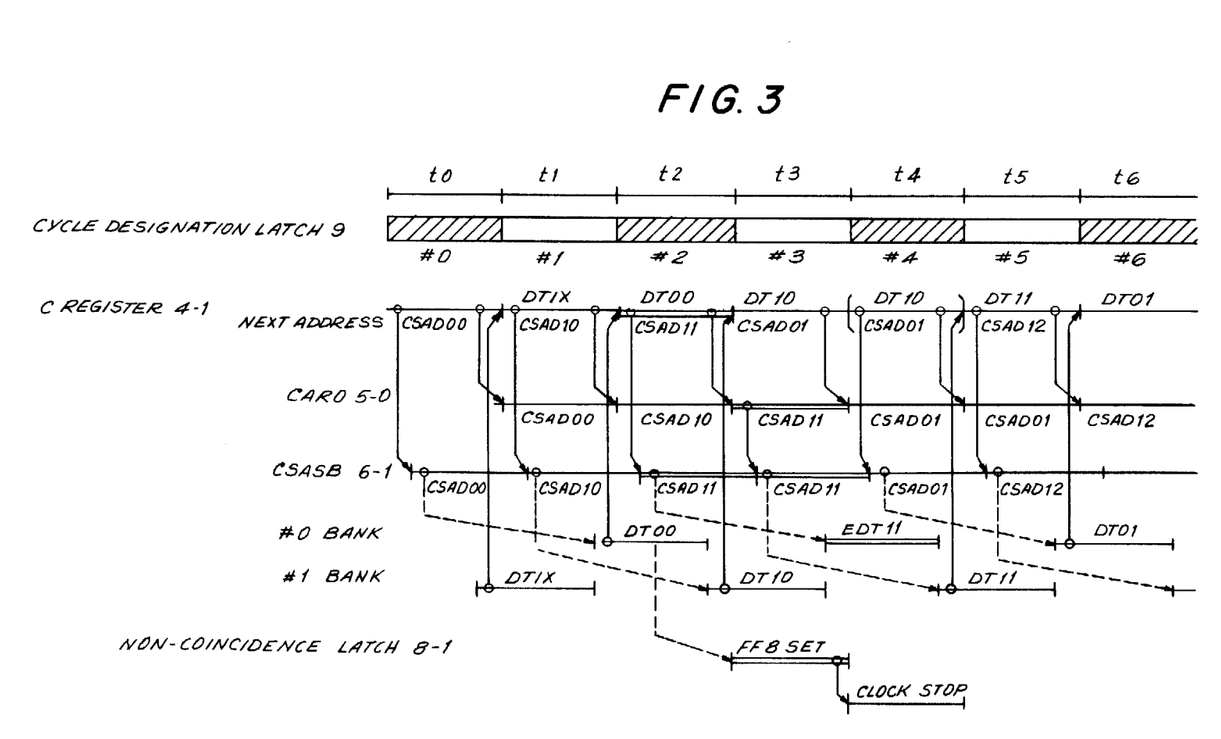
FIG. 3 is a graphical presentation of a time chart for explaining the operation of the access control unit of FIG. 2.

FIG. 2 shows an embodiment of the access control unit of the invention, and FIG. 3 is a time chart for explaining the operation of such embodiment.

The access control unit of FIG. 2 comprises control memory units 1-0 and 1-1 such as, for example, banks. Address registers 2-0 and 2-1 are connected to the control memory units 1-0 and 1-1, respectively. A bank changeover circuit 3-1 and a C register or data register 4-1 are provided. Address holding registers 5-0 and 5-1 are supplied with the readout of the C register 4-1 and read into an address assembler 6-1. A non-coincidence detection circuit 7-1 reads out from the address assembler 6-1 and is connected at its output to the input of a non-coincidence latch 8-1. A cycle designation latch 9-1 has inputs connected to the outputs of AND gates 10-1 and 11-1.

An inverter 12-1 is connected between the output of the cycle designation latch 9-1 and the address register 2-1. Selection gates 13-1 and 14-1 are connected to the outputs of the control memory units 1-0 and 1-1 and are controlled in operation by the bank changeover circuit 3-1. The selection gates 13-1 and 14-1 are coupled to the C register 4-1 via an OR gate 15-1. Address buses 16-0 and 16-1 supply the readout from the C register 4-1 to the address assembler 6-1 and address buses 17-0 and 17-1 connect the address holding register 5-0 to the read in of the address assembler 6-1. Bus changeover gates 18-0 and 18-1 provide the read in to the address assembler 6-1, whose readout is supplied to the address registers 2-0 and 2-1. A clock control latch 19-1 has an input connected to the output of the non-coincidence latch 8-1 and an output coupled to the C register 4-1 via an AND gate 20.

A gate control circuit 21 controls the operation of the bus changeover gates 18-0 and 18-1 via the output of the non-coincidence latch 8-1 and an instruction decoder 22 reading out from the C register 4-1.

The access control unit of FIG. 2 functions as the interleave method. The readout cycle time from each bank is $2t$, as shown in FIG. 3. When access is undertaken for the O bank 1-0 in a cycle $t0$, the readout data or micro instruction appears in the C register 4-1 in the cycle $t2$, after the cycle $t1$. During the cycle $t1$, the processing of the readout is continued at the 0 bank 1-0. At such time, readout access is undertaken to the other bank 1-1, or the 1 bank. The cycle designation latch 9-1 functions as a binary counter, and when the signal ACSO becomes logic "1", for example, said designation latch is first set and then successively set and reset in every cycle. The signals ACSO and ACS1 designate which of the 0 bank 1-0 and the 1 bank 1-1 is to be accessed first. As shown in FIG. 3, access is undertaken to the No. 0 bank 1-0 during the cycles $t0$, $t2$, $t4$, . . ., and then to the No. 1 bank 1-1 during the cycles $t1$, $t3$, $t5$, . . . .

The micro instruction readout to the C register 4-1 may be roughly classified into two types, as follows. One instruction, which is a first type or type 1, is accompanied by all the addresses NAO + NA1 at the next address data region. The other instruction, which is a second type or type 2, has a part of the next address NA1 at the next address data region. The NA0 address is the module address and the NA1 address is the address within the module.

Figure 4A:
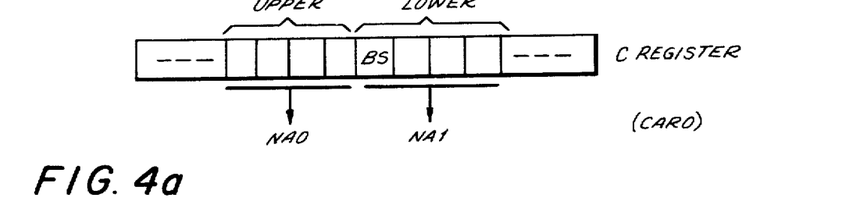
FIGS. 4a, 4b and 4c illustrate the bit format in the next address region and the relation between module and bank.
Figure 4B:
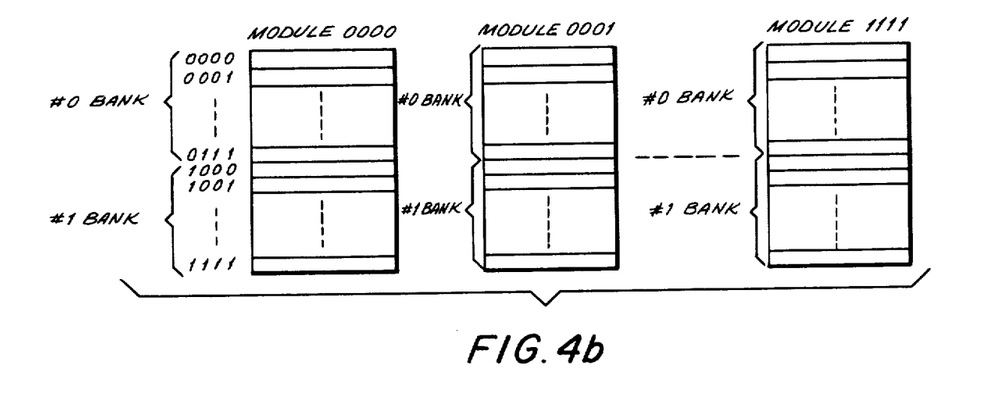

The address format is shown in FIGS. 4a, 4b and 4c. If the NA1 address is of 4 bits configuration, as shown in FIG. 4a, a total of 16 words data, or micro instruction, has come to be stored in one module. In each module, the addresses (0000) to (0111) are included in the No. 0 bank 1-0, while the addresses (0000) to (1111) are included in the No. 1 bank 1-1, as shown in FIG. 4b. In other words, a module means the unit of the address, but not a unit of the hardware. The term bank is used as a unit of hardware.

Figure 4C:
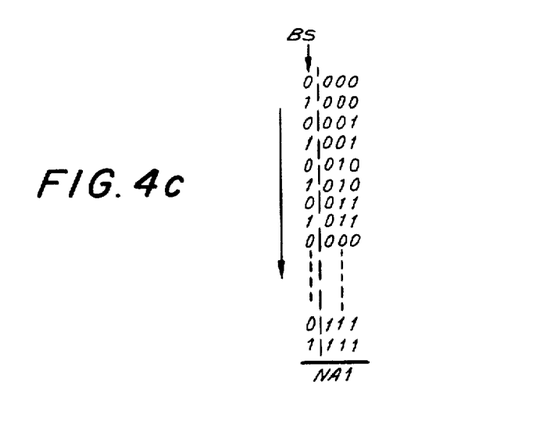

As hereinbefore mentioned, the banks 1-0 and 1-1 have to be accessed alternately. The address NA1 in the module usually changes as shown in FIG. 4c. For the ordinary processing, the address changes in a manner whereby it changes within the module as much as possible, as shown in FIG. 4c. At such time, it is no longer required that the module address NA0 be provided only when access is first undertaken to the relevant module. The module address is successively stored in the upper digits of the address holding register 5-0 of FIG. 2. The type 2 instruction, which is not accompanied by the address NAO, is used to read out into the C register 4-1. In such case, the area of the module address NA0 is effectively used as the bits for the other controls. When the branching instructions are executed, or when every instruction in one module is completed, it is necessary to jump to another module. In such case, it is necessary to provide the module address NA0 by the type 1 instruction.

When the next address is provided by the type 1 instruction, all addresses are supplied to the address assembler 6-1 from the C register 4-1 via the address buses 16-0 and 16-1. When the next address is given by the type 2 instruction, the module address NA0 is supplied to the address assembler 6-1 from the upper digit of the address holding register 5-0 via the address bus 17-0. The address NA1, within the module, is supplied from the C register 4-1 via the address bus 16-1.

In general, in either case, when processing is performed by the type 1 instruction, so that there is a jump to another module, or by the type 2 instruction, so that the processing is within the same module, it is desirable that access be undertaken alternately to both the No. 0 bank and the No. 1 bank. In other words, it would be better if the highest digit BS of the address NA1 in the module coincides with the output of the cycle designation latch 9-1 by inverting such digit between "1" and "0" for every cycle. However, particularly when jumped to another module by conditional branching, for example, when jumped to an address within the same bank, the BS bit of the next address NA1 is likely to show "1" or "03" in succession. The cycle designation latch 9-1 is provided in the access control unit of the present invention in order to simplify the processing in such case. The control is undertaken so that the instruction read out erroneously is not executed by detecting non-coincidence between the output of the cycle designation latch 9-1 and the BS bit of the next address NA1.

The non-coincidence at the cycle time $t2$, shown in FIG. 3, is explained for the case that at the time when access is to be undertaken to the No. 0 bank 1-0 from the contents of the cycle designation latch 9-1, instruction is provided for access to the No. 1 bank from the contents of the next address data area NAO of the micro instruction DT00, or the data at the address 0 of the No. 0 bank, being read out to the C register 4-1. Such non-coincidence occurs during a jump to another routine by the provision of a TRAP signal and a link to a sub-routine or idle word while assigning a word.

In the aforedescribed case, the non-coincidence detection circuit 7-1 produces the non-coincidence output, and the non-coincidence latch 8-1 is set, as shown in FIG. 3, in the cycle time $t3$. Simultaneously, at such time, the contents of NA1 in the next address data area in the micro instruction DT00 set in the C register 4-1 are set in the No. 0 address register 2-0 via the address assembler 6-1 by selection according to the contents of the cycle designation latch 9-1. At the same time, the next address data NA0 + NA1 of the micro instruction DT00 or NA1 is transferred to the address holding register 5-0 and held. However, the address designated by the micro instruction DT00 set in the C register 4-1 should be set in the No. 1 address register 2-1.

In addition, the micro instruction readout from the No. 0 bank in the cycle time $t4$, as shown in FIG. 3, as a result of erroneous access due to the cycle designation latch 9-1, is erroneous and the micro instruction EDT11 should not be executed by the data processor (not shown in the FIGS.). For this reason, in the case of the present invention, the output of the non-coincidence latch 8-1 is supplied to the clock control circuit 19, 20, which comprises the clock control latch 19-1 and the AND gate 20, and the clock is not supplied to the C register 4-1 and other circuits for instruction execution during a specified cycle time, which is the cycle time $t4$, in this case. Thus, an erroneous micro instruction EDT11, shown in FIG. 3, is not executed.

While the cycle time is $t3$, the bus changeover gates 18-0 and 18-1 are operated when the output of the non-coincidence latch 8-1 is set, and the address data CSAD11 is held in the address holding register 5-0; that is, the address CSAD11, designated by the aforementioned micro instruction DT00, is set in the No. 1 address register 2-1 designated by the cycle designation latch 9-1 via the address assembler 6-1. In other words, the address CSAD11 is set again in the No. 1 address register 2-1, this time so that access is properly undertaken to the desired bank, which is the No. 1 bank 1-1, during the cycle time $t3$. Thus, during the cycle time $t5$, the correct micro instruction DT11 is read out to the C register 4-1 on the basis of such access.

In the cycle time $t4$, of course, the address CSAD01 which shall correspond to the address 1 of No. 0 bank, is designated at the next address region of the micro instruction DT10 being read out during the cycle time $t3$. The address CSAD01 is supplied to the address assembler 6-1 from the C register 4-1 via the address bus 16-1 and is properly set to the No. 0 address register 2-0 by the designation of the cycle designation latch 9-1. This is because the clock supply to the address assembler 6-1 is not stopped. Here, all the addresses CSAD$ij$ shown in FIG. 3 are addresses within module NA1. The module address NA0 is provided from the C register 4-1, via the address bus 16-0, when the instructions DT10, etc., which provided the NA1 address are type 1 instructions, as hereinbefore mentioned above, or from the address holding register 5-0, via the address bus 17-0, when such instructions are type 2 instructions. This is exactly the same operation as that in the ordinary time.

The control of the bus changeover gates 18-0 and 18-1 is explained with reference to FIG. 5. Each of the bus changeover gates 18-0 and 18-1 is connected to three address buses. The address buses are HWAU and HWAL for arbitrarily supplying an address, the address buses 16-0 and 16-1 from the C register 4-1, and the address buses 17-0 and 17-1 from the address holding register 5-0. The address buses HWAU, 16-0 and 17-0 are connected to an OR gate 24-0 via switch gates 23-1, 23-2 and 23-3. The address buses HWAL, 16-1 and 17-1 are connected to an OR gate 24-1 via switch gates 23-4, 23-5 and 23-6. The arbitrary address is arbitrarily set at the time of trapping or interruption, and the gates 23-1 and 23-4 are opened by the trap signal TRAP.

When the instruction is a type 1 instruction, the gates 23-2 and 23-5 are opened. When the instruction is a type 2 instruction, the gates 23-3 and 23-6 are opened. The type 1 and type 2 instructions may be distinguished as a result of decoding by the instruction decoder DEC 22. Since the gate control is performed in accordance with the result of this decoding, the setting of the address in the address assembler 6-1 is realized with little delay after the starting of each cycle.

Figure 5:
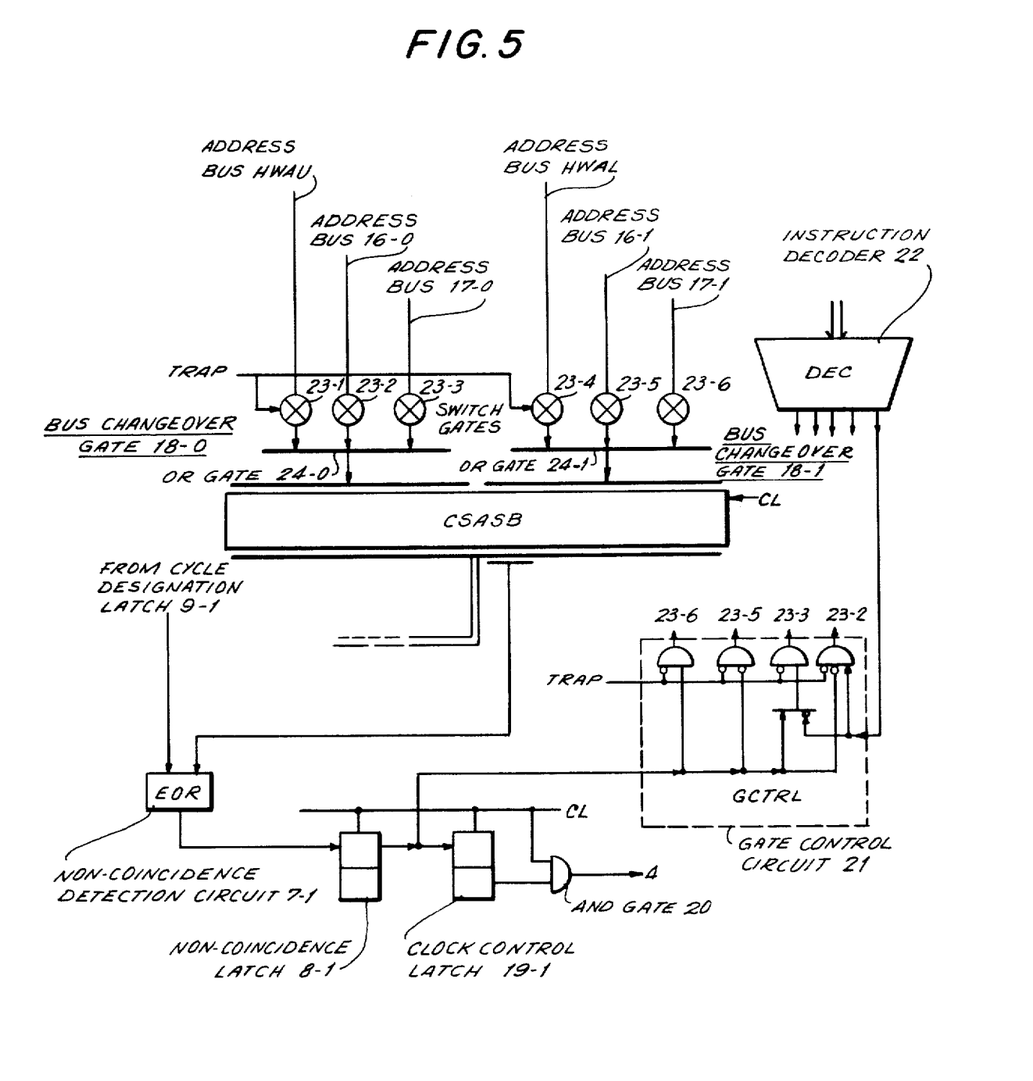
FIG. 5 is a block diagram of an embodiment of the bus changeover gates of the access control unit of the invention.

As shown in FIG. 5, the output of the instruction decoder 22 becomes "1" when the type 1 instruction is used. Usually, the non-coincidence latch 8-1 is in the reset condition. When the bank designation bit BS of the address output from the address assembler 6-1, while in the cycle time t2, for example (FIG. 3) does not coincide, the output of the cycle designation latch 9-1 and the output of the non-coincidence detection EOR circuit 7-1 becomes "1", the non-coincidence latch 8-1 is set to the next cycle time t3, resulting in an output of "1". As a result, the gate 23-5 closes and the gate 23-6 opens, so that the address CSAD11 is supplied from the address holding register 5-0.

At such time, both the output of the cycle designation latch 9-1 and the output of the address assembler 6-1 instruct the No. 1 bank, and therefore the output of the non-coincidence detection EOR circuit 7-1 returns to "0". However, since the non-coincidence latch 8-1 is set, the clock control latch 19-1 is set in the next cycle time t4 and said non-coincidence latch is reset. For this reason, the data EDT11 read out erroneously does not enter the C register 4-1 and, during the cycle time t3, the instruction DT10 remains in said C register as it was. The next address CSAD01 is supplied to the address assembler 6-1 from the C register 4-1 via the address bus 16-1 and the gate 23-5. The normal operating process follows.

Figure 6:
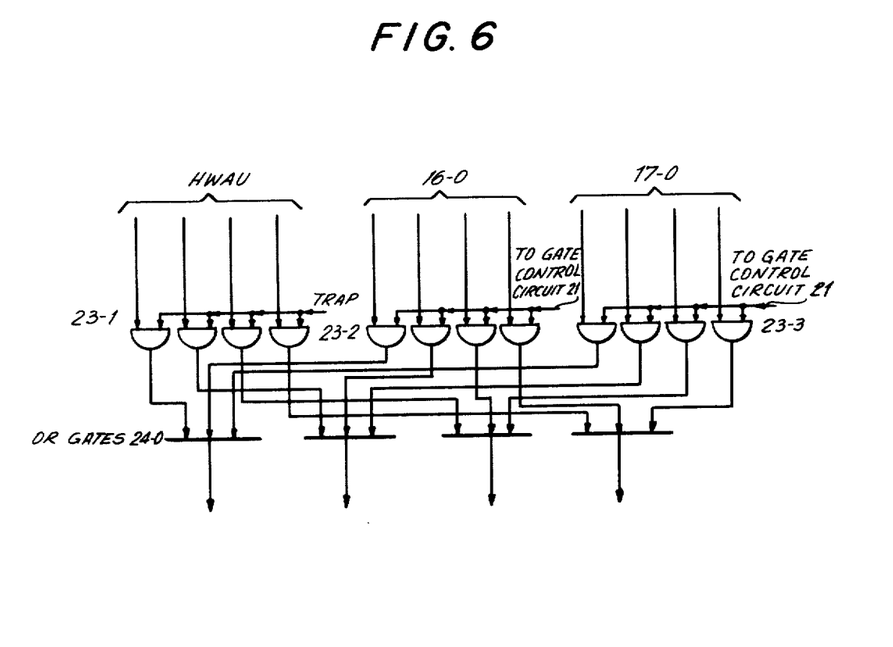
FIG. 6 is a circuit diagram of a bus changeover gate of FIG. 5.

FIG. 6 is a circuit diagram of a bus changeover gate of FIG. 5. Each of the selection gates 13-1 and 14-1 of FIG. 2 may comprise the circuit of FIG. 6.

The address holding register CAR1 5-1, shown in FIG. 2, shelters a return destination address when the signal TRAP is provided and an address before branching when jumped into the main memory unit 2 of FIG. 1.

As hereinbefore mentioned, in accordance with the present invention, access is undertaken to No. 0 bank, No. 1 bank, No. 0 bank, . . ., alternately via the cycle designation latch 9-1. The access coincides with the bank designated by the contents of the next address data area of the micro instructions being read out. However, when non-coincidence occurs due to jump, etc., the non-coincidence latch 8-1 is set and erroneous micro instruction EDT11 is provided as a result of incorrect or improper access in the cycle time t2 permitting the provision of the non-coincidence to be invalidated by stopping the clock at the execution cycle time t4. The next address CSAD11 is temporarily held in the address holding register 5-0 in order to make it possible to read out the correct micro-instruction DT11 in the future cycle time t5. This address is set again in the address register, for example, in the No. 1 address register 2-1, so that it coincides with the designation by the cycle designation latch 9-1 during the cycle time t3.

Thereafter, access is correctly or properly undertaken to the No. 1 bank, No. 0 bank, No. 1 bank, . . ., alternately.

In the aforedescribed emodiment, when the type 2 micro instruction, which is provided only with the address within module NA1 as the next address data, is used, the bit area for which the module address NA0 is essentially provided is used for the control bit for controlling the data processor. It is therefor advantageous that the bit area in the micro instruction may be used effectively. Furthermore, the description of said embodiment is for two interleave methods. However, the present invention may also be applied to three or more nterleave methods. In such a case, the cycle designation latch is considered the counter corresponding to the number of interleaves, and the clock interruption period also increases.

While the invention has been described by means of a specific example and in a specific embodiment, we do not wish to be limited thereto, for obvious modifications will occur to those skilled in the art without departing from the spirit and scope of the invention.

We claim:

1. An access control unit for controlling a memory device having a plurality of memory units for storing data in a manner whereby the memory units are accessed sequentially in an interleaved manner, said access control unit comprising a data register coupled to the memory device for storing data read out from the memory device;

cycle designation means for indicating in every cycle the memory unit of the memory device to be accessed in the relevant cycle;

address means connected between the cycle designation means and the memory device for providing in each cycle an address to the memory unit indicated by the cycle designation means;

non-coincidence detection means coupled to the memory unit of the memory device and connected to the cycle designation means for detecting non-coincidence between the memory unit indicated by said address and the memory unit designated by the cycle designation means upon determination of the distribution destination of that address; and invalidating means coupled between the non-coincidence detection means and the data reqister and utilizing the output of said non-coincidence detection means for invalidating data read out from the memory device in a cycle n cycles after that in which non-coincidence is detected, wherein n is the number of memory units interleaved.

2. An access control unit as claimed in claim 1, wherein the data stored in each memory unit of the memory device includes instructions and the next address, and further comprising instruction decoding means connected to the data register for decoding the contents of the data register.

3. An access control unit as claimed in claim 1, further comprising address holding means connected to the data register for holding an address during a specified cycle, and means connected to the address holding means for supplying the address to be held in the address holding means thereto in a cycle n-1 cycles after that in which non-coincidence is detected by the non-coincidence detection means, wherein n is the number of memory units interleaved.

4. An access control unit as claimed in claim 1, wherein said invalidating means comprises clock control means coupled to the data register for stopping a clock pulse to the data register.

5. An access control unit as claimed in claim 3, wherein data stored in the data register comprises a first type data which includes both the upper and lower digits of the next address and a second type data which includes only the lower digits of the next address, and said address holding means holds both the upper and lower digits of the next address for the first type data and only the lower digits of the next address for the second type data, the upper digits being the same as those of the first type data.

6. An access control unit as claimed in claim 5, further comprising address assembling means connected between the data register and the address means for providing the next address, and means for supplying to the address assembling means both the upper and lower digits of the next address from the data register when data stored in the data register is the first type data, supplying to the address assembling means the upper digits from the address holding means and the lower digits from the data register when data stored in the data register is the second type data, and supplying both the upper and lower digits from the address holding means in the cycle n-1 cycles after that in which non-coincidence is detected by the non-coincidence detection means.

* * * * *